3,517,048
PREPARATION OF METHIONINE-NITRILE
Jozef A. Thoma, Sittard, and Joseph A. M. J. Coonen, Geleen, Netherlands, assignors to Stamicarbon N.V., Heerlen, Netherlands
No Drawing. Filed July 6, 1967, Ser. No. 651,404
Claims priority, application Netherlands, July 14, 1966, 6609885
Int. Cl. C07c *121/42*
U.S. Cl. 260—465.5                                     5 Claims

ABSTRACT OF THE DISCLOSURE

A process for the preparation of $\gamma$-methylmercapto-$\alpha$-aminobutyronitrile from $\beta$-methylmercaptopropionaldehyde by reaction with a cyanide in the presence of ammonia, whereby the use of carefully controlled reaction condition eliminates criticality in the water content of the ammonia reaction medium, is disclosed. The reaction temperature is maintained between 0 and 60° C., the weight ratio of ammonia-water in the liquid medium during the reaction is greater than 1:1, and the reaction conditions are maintained until more than 0.9 mole of the nitrile per mole of aldehyde starting material have been formed. The nitrile so produced may be hydrolyzed to produce methionine.

Background of the invention

Methionine has been made by the prior art by converting $\beta$-methylmercaptopropionaldehyde with a cyanide-reactant in a liquid medium of ammonia, in one stage, into $\gamma$-methylmercapto-$\alpha$-aminobutyronitrile (hereinafter methionine-nitrile) and subsequently hydrolyzed the methionine-nitrile to form methionine. The conversion of $\beta$-methylmercaptopropionaldehyde into methionine-nitrile may be carried out with ammonium cyanide or with another cyanide and an appropriate ammonium compound or with hydrogen cyanide and an appropriate ammonium compound or ammonia itself according to various known processes, as known to the art.

U.S. Pat. 3,131,210, issued Apr. 28, 1964, discloses a process of converting $\beta$-methylmercaptopropionaldehyde into methionine-nitrile with a cyanide-reactant by conducting the reaction at a temperature of between 10 and 50° C. in a liquid reaction medium consisting of ammonia and the reaction water formed during the conversion. According to the working examples of the patent, an approximate quantative yield of methionine-nitrile should be obtained after 1½ hours reaction at room temperature.

Summary of the invention

The present invention is directed to a process for the production of methionine-nitrile in high yields by the use of carefully controlled conditions. In the process of the present invention, either anhydrous liquid ammonia or ammonia with an appreciable water content, or even ammonia containing extra added water, may be used as the reaction medium. The reaction with a cyanide-reactant is carried out at a temperature in the range of 0–60° C., the weight ratio of ammonia to water in the liquid reaction medium during the conversion is greater than 1:1, and the reaction conditions during the conversion are maintained until more than 0.9 mole of methionine-nitrile per mole of aldehyde starting material have been formed.

Detailed description of the invention

Investigations into the cause of the non-quantative yield of methionine-nitrile by the process described in U.S. Pat. 3,131,210 surprisingly revealed that the relatively low yield must be ascribed to the incomplete conversion of the aldehyde to the nitrile. It was surprisingly found that under certain controlled conditions, the yield of the methionine-nitrile can be increased to above 90%, generally under longer reaction times. If the reaction time is prolonged to 4½ hours or more, the conversion of aldehyde into methionine-nitrile at room temperature is even virtually quantative. Yields of over 90% can be achieved if the reaction is conducted with the proper length of time over the entire reaction temperature range of from 0–60° C.

Surprisingly, it has been found that, in the process of the present invention, using the reaction conditions set forth herein, it is not critical that the liquid reaction medium be anhydrous ammonia with no other water present than that formed during the conversion. If the liquid reaction medium is ammonia and water, in a weight ratio of ammonia to water in the liquid medium greater than 1:1 and if the reaction temperatures are maintained in the range of 0 to 60° C., it is possible to obtain a methionine-nitrile yield of the same order of magnitude as that obtained by the prior art process which utilizes a liquid reaction medium consisting of ammonia and no other water than that formed during the conversion. It will be appreciated from the above that methionine-nitrile may be formed in a very high yield if the process for converting $\beta$-methylmercaptopropionaldehyde to methioninenirtile ($\gamma$-methylmercapto-$\alpha$-aminobutyronitrile) is carried out at a temperature of 0–60° C., the weight ratio of ammonia to water in the liquid reaction medium during the conversion is greater than 1:1, and the reaction conditions during the conversion are maintained until more than 0.9 mole of the nitrile per mole of aldehyde have been formed. Preferably the methionine-nitrile is produced using a reaction temperature of 15–40° C. The methionine-nitrile may be readily hydrolyzed into methionine.

In the above described process for producing methionine-nitrile, pressure must be kept above one atmosphere. Suitably, the pressure is maintained at a pressure of 2 to 12 atmospheres. After the aldehyde has been converted into methionine-nitrile, part of the ammonia in the liquid reaction medium may be removed from the reaction mixture by evaporation, conveniently at atmospheric pressure. As the weight ratio ammonia:water in the liquid reaction medium increases, with all other conditions kept equal, a higher reaction pressure is required, wherefore, upon termination of the conversion into methionine-nitrile, a larger portion of the total amount of ammonia used in the reaction may be removed by evaporation at atmospheric pressure. The maximum ammonia-water ratio in the liquid reaction medium is achieved if the water component is exclusively the water formed during the conversion of aldehyde into the methionine-nitrile.

Preferably an amount of liquid reaction medium is employed such that upon termination of the conversion, about 1.2 to 1.7 grams of liquid medium is present per gram of methionine-nitrile. Such an amount of liquid medium is much smaller than that used by the prior art. Although greater amounts of liquid medium, based on the methionine-nitrile produced, may be utilized, more ammonia will be needed at a given ammonia to water ratio in the liquid medium. Clearly, then, the utilization of the preferred range herein allows considerable saving of ammonia.

The process of the present invention may be carried out as a batch process or as a continuous process. The methionine-nitrile may be hydrolyzed and the hydrolysis mixture may be further processed in the conventional way known to the art.

EXAMPLE I

To an autoclave provided with a stirrer and connected to a feed line with a valve, 1.8 moles of hydrogen cyanide and 2 litres of liquid ammonia were fed through the feed line. 1.5 moles of β-methylmercaptopropionaldehyde were then supplied under pressure, at room temperature and with simultaneous stirring, to the autoclave via the feed line, over a period of 10 minutes. After that, with the valve in the feed line closed, the mixture in the autoclave was stirred at room temperature (appr. 20° C.) for 4.5 hours. After this reaction period of 4½ hours, the pressure in the autoclave is approximately 9 atmospheres absolute, and the weight ratio of ammonia to water approximately 43:1.

The autoclave was opened and a large portion of the ammonia was removed from the reaction mixture by evaporation at atmospheric pressure. The methionine-nitrile containing mixture left in the autoclave was added slowly at 25° C. to 1425 g. of sulphuric acid (50 wt.-percent concentration). The resulting mixture was heated under reflux for 1½ hours, yielding 1675 grams of reaction product containing 13.1 wt.-percent of methionine. Calculated to the original amount of β-methylmercaptopropionaldehyde, this represented a yield of 98%.

If all other conditions were kept equal and the above mentioned reaction time was reduced from 4½ hours to 1½ hours, 1681 grams of reaction product with 11.5 wt.-percent of methionine would be obtained, which represents a yield of only 86.5%.

If, instead of hydrogen cyanide, a mixture of sodium cyanide and ammonium chloride was employed, the results would be equal to those mentioned above.

EXAMPLE II

To an autoclave of the same type as that in Example I, 15 g. of hydrogen cyanide and 90 g. of liquid ammonia were supplied through the feed line. Then, 0.5 mole of β-methylmercaptopropionaldehyde, were supplied, under pressure, at room temperature and with simultaneous stirring, to the autoclave via the feed line, over a period of 25 minutes. After that, with the valve in the feed line closed, the mixture in the autoclave was heated up to 30° C., with simultaneous stirring, over a period of 30 minutes. When this temperature was reached, the mixture in the autoclave was stirred, while the temperature was maintained, for another 5½ hours, whereafter the weight ratio of ammonia to water was approximately 9:1. The autoclave was opened and a large portion of the ammonia was removed from the autoclave by evaporation. The mixture remaining in the autoclave was slowly added, at 25° C., to 475 g. of sulphuric acid (50 wt.-percent concentration) and the mixture so obtained was heated under reflux for 1½ hours. 559 grams of reaction product containing 13.2 wt.-percent methionine were obtained, representing a yield of 99% based on the original amount of aldehyde.

The reaction product (559 grams) is neutralized at 20° C. to a pH of 6 by means of aqueous ammonia (20 wt.-percent concentration). Precipitated methionine was removed by filtration. From the filtrate, which contained approximately 40 wt.-percent of ammonium sulphate and some methionine, the methionine was recovered by extraction at 70° C. by means of aqueous ethanol (approximately 70 wt.-percent concentration). From the ethanol-rich fraction ethanol was recovered by distillation. The resulting residue, together with the filtered-off methionine, was crystallized from another liquor obtained from a previous crystallization of methionine from water. 73.5 grams of methionine of 99.5% purity were obtained.

EXAMPLE III

To an autoclave of the same type as that in Example I, 15 g. of hydrogen cyanide, 74 g. of liquid ammonia and 50 g. of water were supplied through the feed line. 0.5 mole of β-methylmercaptopropionaldehyde, were added under pressure, at 30° C. and with simultaneous stirring to the autoclave via the feed line over a period of 25 minutes. With the valve in the feed line closed, the mixture in the autoclave was stirred at 30° C. for 4½ hours, after which the pressure in the autoclave was approximately 3.5 atmospheres absolute, and the weight ratio of ammonia to water approximately 1.1:1. The autoclave was then opened and the ammonia evaporated from the reaction mixture was removed. The mixture left in the autoclave was added slowly, at 25° C., to 445 g. of sulphuric acid (57 wt.-percent concentration), and the resulting mixture was heated under reflux for 1½ hours. 580 grams of reaction product containing 12.45 wt.-percent of methionine were obtained, representing a yield of 97% calculated to the original amount of aldehyde.

EXAMPLE IV

To an autoclave of the same type as that in Example I, 15 g. of hydrogen cyanide, 89 g. of liquid ammonia and 40 g. of water were supplied via the feed line. 0.5 mole of β-methyl-mercaptopropionaldehyde, were then fed under pressure, at 20° C. and with simultaneous stirring to the autoclave via the feed line, over 25 minutes. With the valve in the feed line closed, the mixture in the autoclave was stirred at 30° C. for 4½ hours, whereafter the pressure in the autoclave was approximately 5 atmospheres absolute and the weight ratio of ammonia to water was approximately 1.6:1. The autoclave was opened and the ammonia evaporated from the reaction mixture and removed. The mixture left in the autoclave was added slowly, at 25° C., to 440 g. of sulphuric acid (57 wt.-percent concentration), and the resulting mixture was heated under reflux for 1½ hours. In this way 565 grams of reaction product containing 12.9 wt.-percent of methionine are obtained, representing a yield of 98%, calculated to the original amount of aldehyde.

What is claimed is:

1. In a single-stage process for converting a β-methylmercaptopropionaldehyde with a cyanide-reactant in a liquid reaction medium of ammonia and water into methionine-nitrile, by the direct addition of said aldehyde-cyanide-reactant and ammonia, said liquid reaction medium containing a greater amount of water than the water formed during the formation of said methionine-nitrile, the improvement consisting essentially of converting the β-methylmercaptopropionaldehyde into methionine-nitrile at superatmospheric pressure and temperature of 0–60° C. while maintaining the weight ratio of ammonia to water in the liquid reaction medium during the conversion at a ratio of greater than 1:1, and maintaining the reaction conditions until more than 0.9 mole of nitrile per mole of aldehyde starting material have been formed.

2. The process as claimed in claim 1 wherein the reaction temperature is within the range of about 15 to 40° C.

3. The process as claimed in claim 1, wherein the ratio of the liquid reaction medium to the starting material is such that after the conversion into methionine-nitrile from about 1.2 to 1.7 grams of liquid reaction medium are present per gram of methionine-nitrile formed.

4. The process as claimed in claim 1, wherein said cyanide-reactant is ammonium cyanide.

5. The process as claimed in claim 1, wherein said pressure is from about 2 to about 12 atmospheres.

References Cited

UNITED STATES PATENTS

| 2,732,400 | 1/1956 | Weiss | 260—465.5 XR |
| 3,131,210 | 4/1964 | Hugel et al. | 260—465.5 |

OTHER REFERENCES

Noller: "Chemistry of Organic Compounds," 2nd ed., 1957, pp. 252–253.

JOSEPH P. BRUST, Primary Examiner

U.S. Cl. X.R.

260—534